United States Patent
Zhang et al.

(10) Patent No.: US 9,095,836 B2
(45) Date of Patent: Aug. 4, 2015

(54) MULTIPHASE CATALYTIC TOWER-TYPE IMPINGING-STREAM REACTOR

(75) Inventors: Zhibing Zhang, Jiangsu (CN); Zheng Zhou, Jiangsu (CN); Weimin Meng, Jiangsu (CN); Jiao Geng, Jiangsu (CN); Lei Li, Jiangsu (CN); Gaodong Yang, Jiangsu (CN)

(73) Assignee: NANJING UNIVERSITY (CN)

( * ) Notice: Subject to any disclaimer, the term of this patent is extended or adjusted under 35 U.S.C. 154(b) by 483 days.

(21) Appl. No.: 13/699,140

(22) PCT Filed: Mar. 11, 2011

(86) PCT No.: PCT/CN2011/071708
§ 371 (c)(1),
(2), (4) Date: Feb. 7, 2013

(87) PCT Pub. No.: WO2011/120374
PCT Pub. Date: Oct. 6, 2011

(65) Prior Publication Data
US 2013/0129576 A1 May 23, 2013

(30) Foreign Application Priority Data
Apr. 2, 2010 (CN) .......................... 2010 1 0139533

(51) Int. Cl.
*B01J 8/04* (2006.01)
*B01J 8/00* (2006.01)
(Continued)

(52) U.S. Cl.
CPC *B01J 19/24* (2013.01); *B01J 8/006* (2013.01); *B01J 8/008* (2013.01); *B01J 8/0453* (2013.01);
(Continued)

(58) Field of Classification Search
CPC .............. B01J 8/00; B01J 8/004; B01J 8/005; B01J 8/006; B01J 8/0065; B01J 8/008; B01J 8/04; B01J 8/0446–8/0453; B01J 8/12; B01J 8/125; B01J 8/18; B01J 19/00; B01J 19/24; B01J 19/2405; B01J 10/00; B01J 10/007; B01J 14/00; B01J 14/005; B01J 2208/00796; B01J 2208/00823–2208/00849; B01J 2208/00902
See application file for complete search history.

(56) References Cited

U.S. PATENT DOCUMENTS 2,962,362 A * 11/1960 Moorman ...................... 422/142
4,192,856 A 3/1980 Rapp et al.
(Continued)

FOREIGN PATENT DOCUMENTS

CN 101254444 A 9/2008
CN 101804317 A 8/2010

OTHER PUBLICATIONS

Machine translation of CN101254444A, which was provided in the IDS filed on Nov. 20, 2012 and published Mar. 9, 2008.*
(Continued)

*Primary Examiner* — Natasha Young
(74) *Attorney, Agent, or Firm* — Schmeiser, Olsen & Watts, LLP (57) ABSTRACT

A multiphase catalytic tower-shaped impinging-stream reactor in the form of a tower, the upper part of which is a plate or packed tower 4 and the lower part of which is a multiphase catalytic impinging-stream reaction kettle 2; the upper part and the lower part are separated by a flow channel plate 14 which has a plurality of round holes serving as flow channels 62; at the top of the reaction kettle 2 exists an upper ejector 3 and at the bottom of the reaction kettle 2 exists a lower ejector 8; near to the side wall of the reaction kettle 2 stands a baffle plate 5, which separates a static liquid zone within the reaction kettle 2 is disclosed.

6 Claims, 3 Drawing Sheets

(51) Int. Cl.
  *B01J 8/12* (2006.01)
  *B01J 8/18* (2006.01)
  *B01J 10/00* (2006.01)
  *B01J 14/00* (2006.01)
  *B01J 19/00* (2006.01)
  *B01J 19/24* (2006.01)

(52) U.S. Cl.
  CPC ................ *B01J 8/0492* (2013.01); *B01J 8/125* (2013.01); *B01J 10/007* (2013.01); *B01J 14/005* (2013.01); *B01J 2208/00274* (2013.01); *B01J 2208/00283* (2013.01); *B01J 2208/00849* (2013.01); *B01J 2208/00902* (2013.01)

(56) References Cited

U.S. PATENT DOCUMENTS 4,933,149 A 6/1990 Rhee et al.
6,132,690 A 10/2000 Belmonte et al.
7,531,142 B2 5/2009 Huziwara et al.

OTHER PUBLICATIONS

International Search Report; PCT/CN2011/071708; Int'l Filing Date: Mar. 11, 2011; Nanjing University, 8 pgs.
Written Opinion; PCT/CN2011/071708; Int'l Filing Date: Mar. 11, 2011; Nanjing University, 5 pgs.
International Preliminary Report on Patentability; PCT/CN2011/071708; Int'l Filing Date: Mar. 11, 2011; Nanjing University, 6 pgs.

* cited by examiner

MULTIPHASE CATALYTIC TOWER-TYPE IMPINGING-STREAM REACTOR

This application is a national stage application under 35 U.S.C. §371 of International Application Number PCT/CN2011/071708, now WO 2011/120374, filed Mar. 11, 2011, which claim benefit to Chinese Application 201010139533 X, filed Apr. 2, 2010, the entire contents of which are incorporated herein by reference in its entirety.

FIELD OF TECHNOLOGY

This following relates to a multiphase catalytic tower-type impinging-stream reactor system and the core components thereof

BACKGROUND

Chemical reactors are often utilized in chemical, petrochemical, pharmaceutical and food industries for synthesis of new products. They can be categorized into several types: in terms of operating models, there exist batch reactors, continuous reactors and semi-continuous reactors; in terms of fluid flowing and mixing models, there exist plug flow reactors, ideal reactors and non-ideal reactors. Currently, most reactors utilized for chemical synthesis are fixed-bed reactors or stirred kettle-type reactor. However, the fixed-bed reactor is characteristic of poor thermal conductivity and difficult catalyst replacement during operation while the stirred kettle-type reactor is characteristic of slow rate of reaction and difficulty in maintaining a continuous operating model. Therefore, these types of reactors share such defects as low productivity, complicated side reactions, long reaction time and high cost.

SUMMARY

This invention is designed to solve the defects existing in the abovementioned reactors. It discloses a multiphase catalytic tower-type impinging-stream reactor, namely, a new reactor system utilized for treatment of two- or three-phase reaction systems, such as liquid-liquid (one reagent with a liquid catalyst), liquid-solid (one liquid reagent with a solid catalyst), liquid-liquid-solid (two liquid reagents with a solid catalyst), liquid-liquid-liquid (two liquid reagents with a liquid catalyst), gas-liquid-solid (one gas reagent, one liquid reagent with a solid catalyst) and gas-liquid-liquid (one gas reagent, one liquid reagent with a liquid catalyst) reaction systems.

BRIEF DESCRIPTION

FIG. 2 is the multiphase catalytic tower-type impinging-stream reactor used for treating gas-containing reaction systems, wherein: 25 gas inlet, 26 liquid raw material inlet, 27 liquid circulating material outlet, 28 product outlet, 33 pipe connecting the catch tray and the self-sucking device, 3 upper ejector, 36 gas distributor, 2 multiphase catalytic impinging-stream reaction kettle, 38 baffle plate of the static liquid zone, 8 lower ejector, 40 centrifugal pump, 4 plate or packed tower, 42-44 flowmeters, 45 pipe leading the material into the plate or packed tower, 29, 51 heat exchangers, 15 self-sucking device, 53 filter, 55 catch tray, 30-32, 34, 46-50 valves, 54 first valve, 56 second valve, 57 solid catalyst storage tank, 58 pipe connecting the self-sucking device and the multiphase catalytic impinging-stream reaction kettle, 59 waste gas outlet.

DETAILED DESCRIPTION

Figure 1:
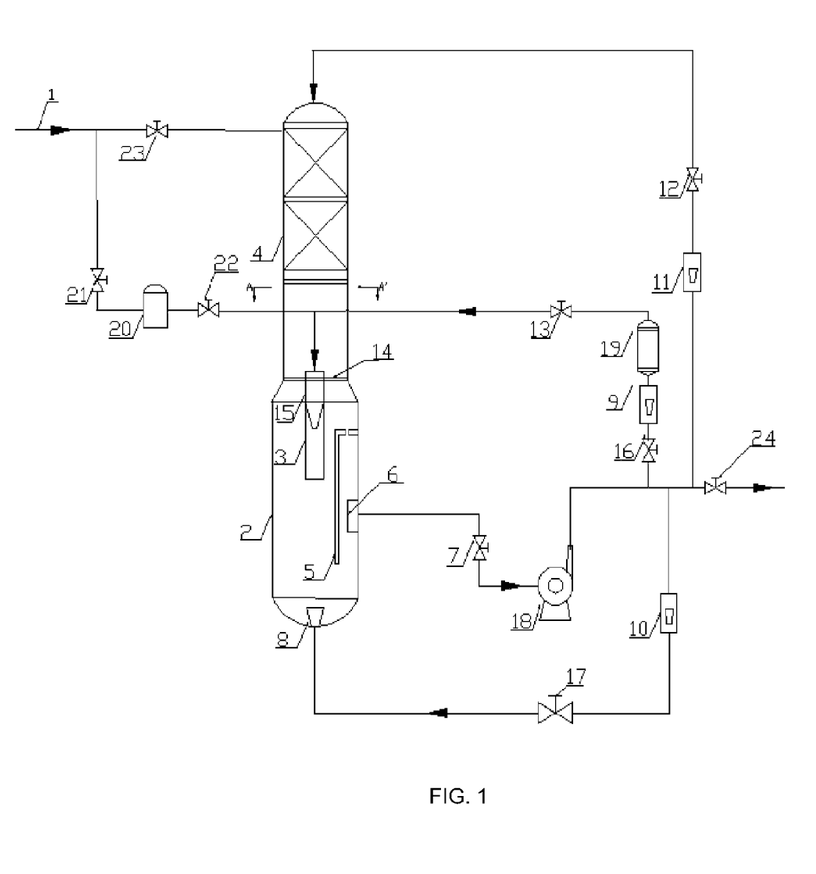
FIG. 1 is the multiphase catalytic tower-type impinging-stream reactor used for treating gasless reaction systems, wherein: 1 liquid raw material inlet, 2 multiphase catalytic impinging-stream reaction kettle, 3 upper ejector, 4 plate or packed tower, 5 baffle plate of the static liquid zone, 6 filter, 8 lower ejector, 9-11 flowmeters, 14 flow channel plate, 15 self-sucking device, 18 centrifugal pump, 19 heat exchanger, 20 solid catalyst storage tank, 7,12,13,16,17, 21-24 valves.
Figure 4:
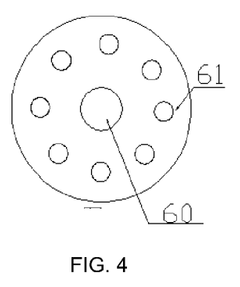
FIG. 4 is the disc distributor on the top of the lower ejector, wherein: 60 vertical channel, 61 oblique channels.
Figure 5:
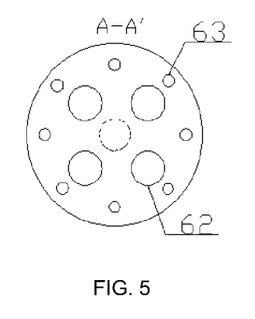
FIG. 5 is the flow channel plate, wherein: 62 flow channels, 63 screw holes.

The technical solutions adopted herein are as follows:

a multiphase catalytic tower-type impinging-stream reactor as is shown in FIG. 1. It consists of two parts: the upper part is a plate or packed tower 4 and the lower part is a multiphase catalytic impinging-stream reaction kettle 2; the upper part and the lower part are separated by a flow channel plate 14 which has a plurality of round holes serving as flow channels 62; at the top of the multiphase catalytic impinging-stream reaction kettle 2 exists an upper ejector 3, which can eject downwards the pumped-in reaction material; on the upper ejector 3 stands a self-sucking device 15, which can simultaneously eject downwards the reaction material in the multiphase catalytic impinging-stream reaction kettle 2 when the upper ejector 3 is in operation; on the bottom of the multiphase catalytic impinging-stream reaction kettle 2 where is exactly opposite to the upper ejector 3 exists a lower ejector 8, which can eject upwards the pumped-in reaction material; the top of the lower ejector is designed with a disc distributor, as is shown in FIG. 4; at the center of the disc distributor exists a vertical flow channel 60, around which are evenly designed with a plurality of oblique flow channels 61; the vertical flow channel 60 and the oblique flow channels 61 ensure that the reaction material is ejected upwards and sidewards respectively so that violent impingement and effective agitation between streams of the reaction material occur in the multiphase catalytic impinging-stream reaction kettle 2; near to the side wall of the multiphase catalytic impinging-stream reaction kettle 2 stands a baffle plate 5, the two sides of which are attached to the side wall of the multiphase catalytic impinging-stream reaction kettle 2; the baffle plate 5 separates a static liquid zone within the multiphase catalytic impinging-stream reaction kettle 2; both upper and lower ends of the baffle plate 5 are designed with slots through which the reaction material in the multiphase catalytic impinging-stream reaction kettle 2 can flow freely into the static liquid zone without causing any turbulence; on the side wall of the multiphase catalytic impinging-stream reaction kettle 2 where the static liquid zone occupies exists a reaction material outlet, in front of which stands a filter 6; the said filter is secured with a filtering mesh so that the solid-phase in the reaction material can be retained within the multiphase catalytic impinging-stream reaction kettle 2. This multiphase catalytic tower-type impinging-stream reactor is suitable for liquid-liquid, liquid-solid, liquid-liquid-solid or other gasless two- or three-phase reaction systems.

The operating mechanism of the multiphase catalytic tower-type impinging-stream reactor disclosed herein goes as follows:

FIG. 1 illustrates the operating procedure of this multiphase catalytic tower-type impinging-stream reactor in treating a gasless reaction system: the liquid raw material flows into the plate or packed tower 4 (hereafter referred to as tower 4) through the pipe 1 for pre-reaction, then flows through the flow channels 62 on the flow channel plate 14 into the multiphase catalytic impinging-stream reaction kettle 2 (hereafter referred to as reaction kettle 2); the pressure in the reaction kettle 2 can be set and adjusted in accordance with the requirements. When a liquid-liquid-solid reaction system is processed, the catalyst is resin or other solid materials insoluble in the liquid; the said catalyst is mixed with the liquid-phase material in the solid catalyst storage tank 20 and then flows into the reaction kettle 2. When a liquid-liquid-liquid reaction system is processed, the catalyst is a liquid acid; both the liquid material and the liquid catalyst flow through the pipe 1 into the tower 4, then through the flow channels 62 on the flow channel plate 14 into the reaction kettle 2 for reaction. The material in the reaction kettle 2 flows through the baffle plate 5 into the static liquid zone, where, due to existence of baffle plate 5, the turbulent liquid gradually settles down before arriving the filter 6; the solid-phase catalyst in the reaction kettle 2 will fall through the slotted lower end of the static liquid zone and flow back into the reaction kettle 2, therefore no catalyst flows with the current and is stuck on the filtering mesh of the filter 6, which consequently prevents blockage of the outlet; meanwhile, the liquid-phase reaction material flows through the filtering mesh, the centrifugal pump 18, the flowmeter 9 and the heat exchanger 19, and is ejected back into the reaction kettle 2 through the upper ejector 3 for further reaction; a circulation of the liquid-phase reaction material is therefore established. The violent turbulence of the liquid-liquid-solid or liquid-liquid-liquid three-phase reaction system in the reaction kettle 2 ensures sufficient contact between the molecules of reagents and the catalyst, which consequently effectively enhances rate of reaction and rate of conversion; meanwhile, turning on the valve 17 to lead a stream of the reaction material through the bottom of the reaction kettle 2 so that it can be ejected upwards in great speed by the lower ejector 8; an forced circulation of the reaction material is also established; an impingement is realized between the upward and downward streams of the reaction material, and the agitation is effectively enhanced. In addition, when the said reaction kettle is adopted to process a liquid-liquid-solid reaction system, the design of the lower ejector can prevent deposition of the solid catalyst on the bottom of the reaction kettle 2; it can also prevent uneven distribution of the catalyst in the reaction kettle 2 by improving even suspension of the catalyst grains in the reaction kettle 2 and its random movement with the liquid flow; when the said reaction kettle is adopted to process a liquid-liquid-liquid reaction system, the said design ensures more sufficient contact of reagents in the whole reaction system, particularly, it can enormously increase the rate of conversion when the two liquid-phase reagents are mutually insoluble (for example, water and oil).

After a certain period of reaction, turning on the valve 12 to lead a stream of the reaction liquid through the tower top into the tower 4 for further reaction, which can increase the rate of conversion to a higher level. As the last step, the reaction liquid at the bottom of the tower 4 flows back into the reaction kettle 2 through the flow channels 62 on the flow channel plate 14 for further reaction. When a liquid-liquid-solid reaction system is processed, part of catalyst grains may be worn or broken apart due to the violent impingement in the reaction kettle 2; the smaller grains formed thereby may flow through the filtering mesh of the filter 6 out of the reaction kettle 2 and back into the tower 4 through the top of the tower 4, which can effectively accelerate the reaction process; when a liquid-liquid-liquid reaction system is processed, the catalyst is contained within the reaction material, and the rate of conversion can be further enhanced by the reaction taking place in the tower 4.

After a certain period of reaction, the reaction material is discharged from the valve 24 for follow-up procedures. Meanwhile, the new raw material is supplied through the pipe 1 so as to maintain the material equilibrium of the whole system.

When the reaction material contains a gas-phase component, the flow channel plate 14 in the said multiphase catalytic tower-type impinging-stream reactor is replaced with a catch tray 55 (see FIG. 2) made of an imperforate blind plate. The pipe and the valve 54 is adopted to connect the lower part of the plate or packed tower 4 and the lower part of the catch tray 55 with the multiphase catalytic impinging-stream reaction kettle 2 so that the gas collected in the upper part of the multiphase catalytic impinging-stream reaction kettle can flow into the plate or packed tower 4; the pipe 33 and the valve 56 is adopted to connect the lower part of the plate or packed tower 4 with the self-sucking device 15 on the upper ejector 3 of the multiphase catalytic impinging-stream reaction kettle 2 so that the reaction liquid at the bottom of the plate or packed tower 4 can flow into the self-sucking device 15 on the upper ejector 3 of the multiphase catalytic impinging-stream reaction kettle 2; the pipe 58 is adopted to connect the self-sucking device 15 on the upper ejector 3 of the multiphase catalytic impinging-stream reaction kettle 2 with the multiphase catalytic impinging-stream reaction kettle 2 so that the unreacted gas in the multiphase catalytic impinging-stream reaction kettle 2 can be channeled back for cyclic reaction.

Figure 2:
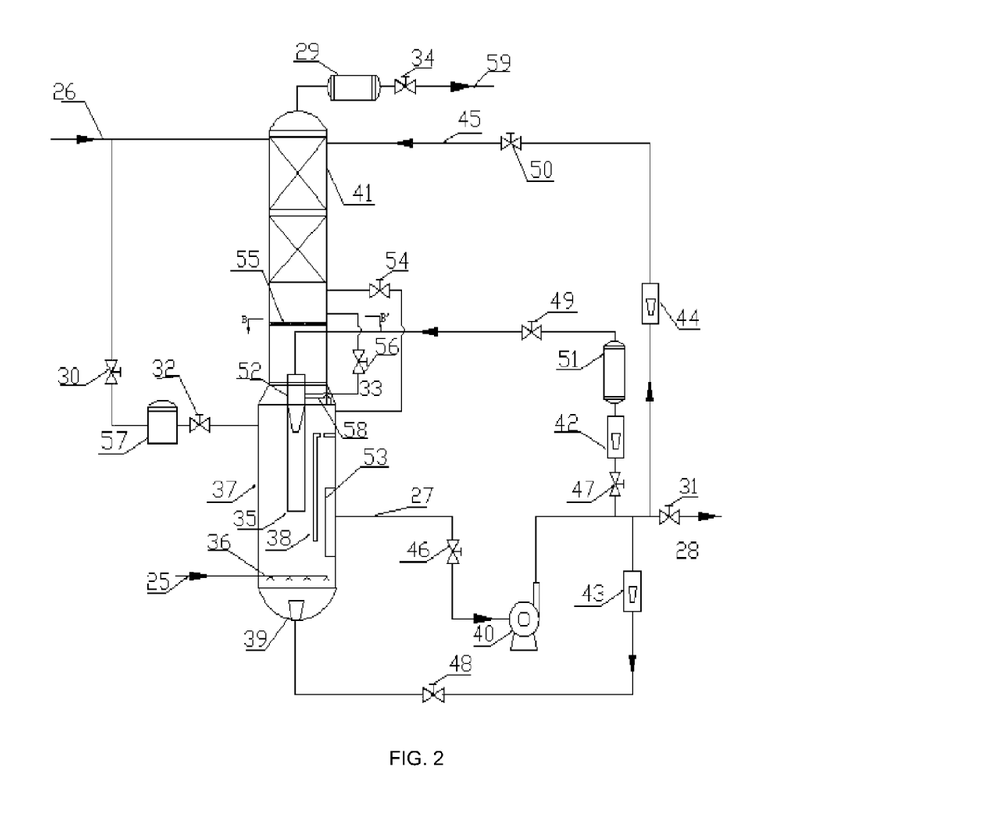

In addition, the inlet pipe 25 and the gas distributor 36 are installed at the bottom of the multiphase catalytic impinging-stream reaction kettle 2.

FIG. 2 illustrates the operating procedure of this multiphase catalytic tower-type impinging-stream reactor in treating a gas-containing reaction system:

The liquid-phase raw material flows through the pipe 26 into the plate or packed tower 4 (hereafter referred to as tower 4) for pre-reaction, then flows into the multiphase catalytic impinging-stream reaction kettle 2 (hereafter referred to as reaction kettle 2) for reaction; the pressure in the reaction kettle is 0.2-1.5 MPa (gauge pressure); When a gas-liquid-solid reaction system is processed, the catalyst is resin or other solid materials insoluble in the liquid; the catalyst is mixed with the liquid raw material in the solid catalyst storage tank 57 and then flows into the reaction kettle 2; when a gas-liquid-liquid reaction system is processed, the catalyst is a liquid acid; both the liquid raw material and the liquid catalyst flow through the pipe 26 into the tower 4 for pre-reaction, then into the reaction kettle 2 for reaction. The gas-phase raw material flows through the pipe 25, the gas distributor 36 into the reaction kettle 2 and has reaction with the liquid-phase material therein. The reaction material in the reaction kettle 2 flows through the baffle plate 38 into the static liquid zone, where, due to existence of baffle plate 38, the turbulent liquid gradually settles down before arriving the filter 53; the solid-phase catalyst in the reaction kettle 2 will fall through the slotted lower end of the static liquid zone and flow back into the reaction kettle 2, therefore no catalyst flows with the current and is stuck on the filtering mesh of the filter 53, which consequently prevents blockage of the outlet; meanwhile, the liquid-phase reaction material flows through the centrifugal pump 40, the flowmeter 42 and the heat exchanger 51, and is ejected by the upper ejector 3 back into the reaction kettle 2, where it has another round of reaction with the up-going gas; a circulation of the liquid-phase reagent is therefore established. The violent turbulence of the gas-liquid-solid or gas-liquid-liquid three-phase reaction system in the reaction kettle 2 ensures sufficient contact between the molecules of reactants as well as molecules of reactants and the catalyst, which consequently effectively enhances rate of reaction and rate of conversion; meanwhile, turning on the valve 48 to lead a stream of the reaction liquid through the bottom of the reaction kettle 2 so that it can be ejected upwards in great speed by the lower ejector 39; an forced circulation is also established, an impingement is realized between the upward and downward streams of the reaction liquid and the agitation is effectively enhanced;

In addition, when the said reaction kettle is adopted to process a gas-liquid-solid reaction system, the design of the lower ejector can prevent deposition of the solid catalyst on the bottom of the reaction kettle 2 and its uneven distribution by improving even suspension of the catalyst grains in the reaction kettle 2; when the said reaction kettle is adopted to process a gas-liquid-liquid reaction system, the said design ensures more sufficient contact of reagents in the whole reaction system; it can enormously increase the rate of conversion particularly when the liquid-phase reagents are mutually insoluble.

In the reaction kettle 2, the incompletely reacted gas emits up over the liquid surface and flows through the low-pressure area around the nozzle of the self-sucking device 15 on the upper ejector 3; the incompletely-reacted gas is therefore sucked into the liquid mainstream in the reaction kettle 2 through the pipe 58 for further reaction. The circulation established thereby enormously improves efficiency in utilizing the gas.

After a certain period of reaction, turning on the valve 54 so that the incompletely-reacted gas in the upper part of the reaction kettle 2 can flow into the tower-type reactor 4 through its lower part; meanwhile, turning on the valve 50 to lead a stream of liquid reaction material through the pipe 45 into the upper part of the tower 4 so that it can have another round of reaction with the up-going gas; the conversion rate of the gas is therefore further increased. When a gas-liquid-solid reaction system is processed, the smaller catalyst grains resulting from abrasion and fragmentation of the original solid catalyst can flow through the filter 53 and present even higher catalytic activity, which effectively accelerates the reaction process; when a gas-liquid-liquid reaction system is processed, the catalyst is contained within the liquid reaction material, and the conversion rate of the liquid and the gas reagents is further enhanced because the reaction taking place in the tower 4 prolongs the total reaction time. Finally, a slightest amount of unreacted gas directly emits out of the tower top through the heat exchanger 29 and the liquid-phase material at the bottom of the tower 4 flows down through the pipe 33 into the reaction kettle 2 for further reaction. As a result of the reaction taking place in the tower 4, the content of the gas-phase reagent in the waste gas discharged through tower top pipe 59 is very low. In addition, since the tower 4 is designed with tower plates or packing or both, it can separate apart the light and heavy components of the mixed gas to a certain degree. Therefore, the tower 4 not only effectively improves the efficiency of utilizing the gas and the yield of the whole system, but also simplifies the follow-up procedures and operating art, reduces the energy consumption and benefits to environment protection.

After a certain period of reaction, the liquid reaction material is discharged from the valve 31 for follow-up procedures. Meanwhile, the new raw material is supplied through the pipe 26 so as to maintain the material equilibrium of the whole system.

Figure 3:
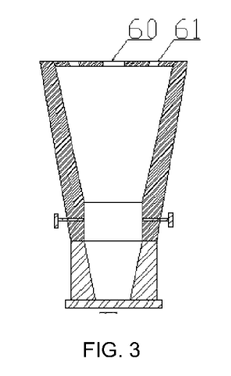
FIG. 3 is the lower ejector in section view.

The upper ejector 8 of the said multiphase catalytic tower-type impinging-stream reactor is bell-mouth in shape, its section view being shown in FIG. 3; at the center and periphery of the disc distributor installed on the upper end of the said ejector 3 respectively exist a vertical hole 60 and a ring of oblique holes 61 with obliquity of 5°-20° (its top view is shown in FIG. 4); the liquid at the bottom of multiphase catalytic impinging-stream reaction kettle is ejected upwards and sidewards from these holes so that the gravity-induced deposition of the solid catalyst on the bottom of the reactor can be effectively prevented, which then guarantees even suspension of the catalyst as well as sufficient contact and mass transfer between the catalyst and the liquid; when a liquid catalyst is used, there is no dead corner in the reactor and the flow field distribution of the whole reaction system is even better.

The lower ejector 8 of the said multiphase catalytic tower-type impinging-stream reactor can be secured on the bottom of the multiphase catalytic impinging-stream reaction kettle by means of welding or a flange.

Figure 6:
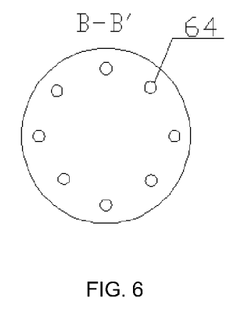
FIG. 6 is the catch tray, wherein: 64 screw holes.

The catch tray 55 of the said multiphase catalytic tower-type impinging-stream reactor is a blind plate secured by means of a plurality of screws, as is shown in FIG. 6; it collects the liquid flowing down from the plate or packed tower; when the collected liquid reaches a certain height, the valve 56 is turned on so that the liquid, along with the unreacted gas of the multiphase catalytic impinging-stream reaction system, flows back into the reaction kettle 2 through the pipe 33 and the self-sucking device 15.

Figure 7:
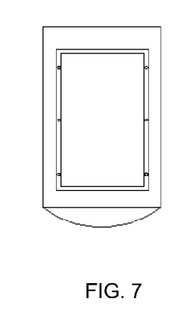
FIG. 7 is the baffle plate of the static liquid zone.

Within the said multiphase catalytic tower-type impinging-stream reactor, the upper and lower ends of the said baffle plate 5 of the static liquid zone are a certain distance away from the top and the bottom the multiphase catalytic impinging-stream reaction kettle so that the reaction material can circulate between the static liquid zone and the outside turbulent zone on the basis of U-tube principle; the said distance ranges from 5 mm to 20 mm.

The baffle plate 5 of the static liquid zone of the said multiphase catalytic tower-type impinging-stream reactor is removable; it is secured on the side wall of the multiphase catalytic impinging-stream reaction kettle by means of slots or screws.

The invention disclosed herein has the following advantages:

(1) when the multiphase catalytic tower-type impinging-stream reactor disclosed in this invention is adopted, a violent turbulence is generated by the impingement resulted from the high-speed downward stream and upward stream ejected respectively from the top and bottom of the multiphase catalytic impinging-stream reaction kettle; the said violent turbulence effectively enhances contact between molecules of reagents as well as the molecules of reagents and the catalyst; the sever agitation of the catalyst guarantees its even distribution within the multiphase catalytic impinging-stream reaction kettle; in addition, such a soft agitation as is generated by the violent turbulence not only protects the catalyst from severe abrasion, but also accelerates the reaction process.

(2) when the said multiphase catalytic tower-type impinging-stream reactor is adopted for treatment of a gas-containing reaction system, a self-sucking device is designed for repeatedly sucking the unreacted gas in the top of the multiphase catalytic impinging-stream reaction kettle back into the mainstream of the reaction material in the multiphase catalytic impinging-stream reaction kettle by means of negative pressure formed by quickly downward-ejecting stream; the circulation of the gas established thereby can greatly compensate the disadvantage resulting from short retention time of the gas in the reactor; in addition, the self-sucking device can also suck from the catch tray the liquid collected from the plate or packed tower into the upper ejector, and then eject it into the multiphase catalytic impinging-stream reaction kettle, which effectively increases the conversion rate of the raw material, the formation rate of the product and the selectivity of the reaction.

(3) within the multiphase catalytic impinging-stream reaction kettle of the said multiphase catalytic tower-type impinging-stream reactor, a baffle plate is designed in front of the filter so that a static liquid zone is established between the said baffle plate and the filter; since there exists no violent turbulence in the static liquid zone, the solid catalyst in the multiphase catalytic impinging-stream reaction kettle will settle down and flow back into the multiphase catalytic impinging-stream reaction kettle through the slotted lower end of the static liquid zone; therefore the solid catalyst will not flow away with the high-speed current and be stuck on the filtering mesh of the filter, which consequently prevents blockage of the product outlet; the baffle plate of the static liquid zone is removable, and it can be removed when the reaction system contains no solid-phase material.

(4) at the bottom of the said multiphase catalytic tower-type impinging-stream reactor exists a lower ejector in the shape of a bell mouth; the liquid is ejected upwards and sidewards from the bottom of the multiphase catalytic impinging-stream reaction kettle through a vertical hole and a ring of oblique holes designed respectively at the center and periphery of the disc distributor of the lower ejector; such a design will prevent deposition of the solid catalyst on the bottom of the multiphase catalytic impinging-stream reaction kettle and obtain an ideal suspension of the solid catalyst therein, which guarantees sufficient contact between the solid catalyst and the liquid; when a liquid catalyst is adopted, the abovementioned design will eliminate any dead corner of reaction and push the turbulence of the whole reaction system to a more violent level.

(5) the design of the said plate or packed tower facilitates pre-reaction of the raw material therein; it also expedites the unreacted gas or liquid to convert into the product; in addition, it can separate apart the light and heavy components of the mixed gas to a certain degree; therefore, this design not only increases the yield, but also simplifies the follow-up procedures, reduces energy consumption and production cost, and benefits to the environment protection.

(6) when the said multiphase catalytic tower-type impinging-stream reactor is adopted for treatment of a gasless reaction system, a flow channel plate is installed between the plate or packed tower and the multiphase catalytic impinging-stream reaction kettle; it connects the plate or packed tower with the multiphase catalytic impinging-stream reaction kettle so that the liquid can pre-react in the plate or packed tower and then flow directly into the multiphase catalytic impinging-stream reaction kettle for reaction; when the said multiphase catalytic tower-type impinging-stream reactor is adopted for treatment of a gas-containing reaction system, the said flow channel plate can still be installed between the plate or packed tower and the multiphase catalytic impinging-stream reaction kettle; its operating mechanism is similar to that of treating a gasless reaction system; in addition, a catch tray can also be used to connect the plate or packed tower with the multiphase catalytic impinging-stream reaction kettle; it collects the liquid flowing down from the plate or packed tower; when the collected liquid reaches a certain height, the valve 56 is turned on; the collected liquid in the catch tray therefore joins together with the unreacted gas in the multiphase catalytic impinging-stream reaction kettle and flows through the pipe 33 and the self-sucking device 52 into the multiphase catalytic impinging-stream reaction kettle 37.

Embodiments

Embodiment 1 (Liquid-liquid-solid Three-phase Reaction System)

Mixing dihydromyrcene, water and acetone at the mass ratio of 1:1:2, leading the mixture through the pipe 1 into the plate tower 4 for pre-reaction and then into the reaction kettle 2; the reaction kettle 2 has a volume of 6 m$^3$, its diameter-height ratio being 1:1.5; the diameter of the packed tower 4 is a half of the diameter of the reaction kettle 2 while its height is similar to that of the reaction kettle 2; the packing used herein is 4 mm×4 mm θ rings made of 316L stainless steel. Turning on the valve 21 to lead a stream of the liquid material from the pipe 1 to the catalyst feeding device 20 so that it can mix with the solid catalyst (10% of the liquid material by mass ratio) and then flow into the reaction kettle 2. The solid catalyst adopted herein is Amberlyst 15 (manufactured by Rohm and Hass Company); keeping the reaction temperature at 100° C. and the reaction pressure at 0.5 MPa. The liquid in the reaction kettle 2 flows through the baffle plate 5 of the static liquid zone (the baffle plate is secured by means of slots, its two ends are 10 mm away from the top and bottom of the reaction kettle 2 respectively) and the filter 6 into the centrifugal pump 18, then through the flowmeter 9 and the heat exchanger 19 and is ejected back into the reaction kettle 2. Meanwhile, turning on the valve 17 and leading a stream of the liquid to the lower ejector 8 (the obliquity of the holes at the periphery of the disc distributor is) 5° so that it can be ejected into the reaction kettle 2. After 1 hour of reaction, turning on the valve 12 and leading the liquid into the packed tower 4; this part of the liquid flows through the flow channels 64 on the flow channel plate 14 and returns into the reaction kettle 2; after 3 hours of reaction, turning on the valve 24 and discharging the product; the discharged product is ready for the follow-up procedures; meanwhile the new raw material is supplied from the pipe 1 to maintain the material equilibrium of the whole reaction system. The conversion rate of dihydromyrcene in the hydration process adopted herein reaches 73%, and the reaction selectivity is higher than 70%; the annual yield of dihydromyrcenol can reaches 7,000 tons.

Embodiment 2 (Liquid-liquid-solid Three-phase Reaction System)

The operating method is similar to Embodiment 1, wherein dihydromyrcene, water and ethanol are mixed at the mass ratio of 1:1:2; keeping the reaction temperature at 105° C. and the reaction pressure at 0.6 MPa; the solid catalyst used herein is Amberlyst 35 (manufactured by Rohm and Hass Company), and it is 20% of the liquid material by mass ratio. The obliquity of the holes at the periphery of the disc distributor on the lower ejector is 10°; the baffle plate of the static liquid zone is secured by means of screws; its two ends are 5 mm away from the top and bottom of the reaction kettle 2 respectively. The conversion rate of dihydromyrcene in the process adopted herein reaches 33.5%, and the reaction selectivity is higher than 70%.

Embodiment 3 (Liquid-liquid-solid Reaction System)

The operating method is similar to Embodiment 1, wherein acetic acid and n-butanol are mixed at the mole ratio of 2:1; keeping the reaction temperature at 85° C. and the reaction pressure at 0.15 MPa; the solid catalyst used herein is Amberlyst 15 (manufactured by Rohm and Hass Company) with modification, and the catalyst is 10% of the acetic acid by mass ratio; keeping 2 hours of reaction. The obliquity of the holes at the periphery of the disc distributor on the lower ejector is 15°; the baffle plate of the static liquid zone is secured by means of screws; its two ends are 5 mm away from the top and bottom of the reaction kettle 2 respectively. The conversion rate of n-butanol in the process adopted herein reaches 85% and the reaction selectivity 100%.

Embodiment 4 (Liquid-liquid-liquid Reaction System)

The operating method is similar to Embodiment 1, wherein dihydromyrcene, water and isopropanol are mixed at the mass ratio of 1:1:1; keeping the reaction temperature at 110° C. and reaction pressure at 0.8 MPa; the catalyst is 10% sulfuric acid solution (the amount of 100% $H_2SO_4$ added in is 1% of the total material); the mixture flows into the packed tower 4 for pre-reaction and then into the reaction kettle 2 for reaction. The obliquity of the holes at the periphery of the disc distributor on the lower ejector is 20°. The conversion rate of dihydromyrcene in the process adopted herein reaches 35%, and the reaction selectivity is higher than 50%.

Embodiment 5 (Liquid-liquid-liquid Reaction System)

The operating method is similar to Embodiment 1, wherein acetic acid and n-butanol are mixed at the mole ratio of 4:1; keeping the reaction temperature at 100° C.; the catalyst is 5% sulfuric acid solution (the amount of 100% $H_2SO_4$ added in is 0.5% of the total material); the mixture flows into the packed tower 4 for pre-reaction and then into the reaction kettle 2 for reaction. The obliquity of the holes at the periphery of the disc distributor on the lower ejector is 15°. The conversion rate of n-butanol in the process adopted herein reaches 90% and the reaction selectivity 100%.

Embodiment 6 (Liquid-liquid-solid Three-phase Reaction System)

Acetic acid and butene are prepared at the mole ratio of 1:1.1; leading the acetic acid through the pipe 26 into the packed tower 41 for pre-reaction and then into the reaction kettle 2; leading the butene through the pipe 25, the gas distributor 36 into the reaction kettle 2; keeping the reaction temperature at 110° C. and reaction pressure at 0.8 MPa (gauge pressure); turning on the valve 30 to lead a stream of the liquid material into the catalyst feeding device 57 so that it can mix with the solid catalyst (10% of the acetic acid by mass ratio) and flow into the reaction kettle 2; the solid catalyst used herein is Amberlyst 15 (manufactured by Rohm and Hass Company) with modification; the material in the reaction kettle 2 flows through the baffle plate 38 of the static liquid zone (secured by means of slots; two ends of which are 20 mm away from the top and bottom of the reaction kettle 2 respectively) and the filter 53 into the centrifugal pump 40, then through the flowmeter 42, the heat exchanger 51 and is ejected back into the reaction kettle 2 by the upper ejector 3; meanwhile, turning on the valve 24 to lead a stream of the liquid to be ejected upwards into the reaction kettle 2 by the lower ejector 39 (the obliquity of the holes at the periphery of the disc distributor on the lower ejector is 10°). The gas in the upper part of the reaction kettle 2 is sucked into the reaction liquid through the pipe 58 by the self-sucking device 15; after 0.2 hours of reaction, turning on the valve 54 so that the unreacted gas can flow into the tower reactor 41 from its bottom; meanwhile turning on the valve 50 to lead a stream of the liquid through the packed tower 4 into the catch tray; when the liquid in the catch tray reaches a certain height, turning on the valve 56 and the liquid will be sucked back into the reaction kettle 2 by the self-sucking device 15 through the pipe 33. After 0.5 hours of reaction, turning on the valve 31 and the reaction liquid is discharged out through the pipe 28 for the follow-up procedures; meanwhile, the new raw material is supplied through the pipe 26 so as to maintain the material equilibrium of the whole system. The conversion rate of acetic acid in the process adopted herein reaches 77.4%, and the content of butene in the waste gas reduces down to 0.11%.

Embodiment 7 (Gas-liquid-solid Three-phase Reaction System)

The operating method is similar to Embodiment 6, wherein the mole ratio of acetic acid and butene is 1:1.2, keeping the reaction temperature at 115° C. and the reaction pressure at 1.0 MPa (gauge pressure); the catalyst used herein is D-72 (15% of the acetic acid by mass ratio); The obliquity of the holes at the periphery of the disc distributor on the lower ejector is 20°; the baffle plate of the static liquid zone is secured with screws and its two ends are 15 mm away from the top and bottom of the reaction kettle 2 respectively. The conversion rate of acetic acid in the process adopted herein reaches 76.7%, and the content of butene in the waste gas reduces down to 0.9%.

Embodiment 8 (Gas-liquid-liquid Reaction System)

The operating method is similar to Embodiment 6, wherein the mole ratio of acetic acid and butene is 1:1.2, keeping the reaction temperature at 120° C. and the reaction pressure at 1.2 MPa (gauge pressure); the liquid catalyst used herein is p-toluene sulfonic acid (7% of the acetic acid by mass ratio); The obliquity of the holes at the periphery of the disc distributor on the lower ejector is 15°; The conversion rate of acetic acid in the process adopted herein reaches 72%, and the content of butene in the waste gas reduces down to 1.2%.

What is claimed is:

1. A multiphase catalytic tower-type impinging-stream reactor consisting of two parts, wherein an upper part is a plate tower and a lower part is a multiphase catalytic impinging-stream reaction kettle; the upper part and the lower part are separated by a flow channel plate which has a plurality of round holes serving as flow channels; at the top of the multiphase catalytic impinging-stream reaction kettle exists an upper ejector, which can eject downwards the pumped-in reaction material; there is a self-sucking device on the upper ejector; at the bottom of the multiphase catalytic impinging-stream reaction kettle where is exactly opposite to the upper ejector exists a lower ejector, which can eject upwards the pumped-in reaction material; the top of the lower ejector is designed with a disc distributor, at the center of which exists a vertical flow channel; around the vertical flow channel are evenly designed with a ring of oblique flow channels; the vertical flow channel and the oblique flow channels ensure that the reaction material is ejected upwards and sidewards respectively; near to the side wall of the multiphase catalytic impinging-stream reaction kettle stands a baffle plate, the two sides of which are firmly attached to the side wall of the multiphase catalytic impinging-stream reaction kettle; the baffle plate separates a static liquid zone within the multiphase catalytic impinging-stream reaction kettle; both upper and lower ends of the baffle plate are designed with slots through which the reaction material in the multiphase catalytic impinging-stream reaction kettle can flow freely into the static liquid zone without causing any turbulence; on the side wall of the multiphase catalytic impinging-stream reaction kettle where the static liquid zone occupies exists a reaction material outlet, in front of which stands a filter secured with a filtering mesh so that the solid-phase reaction material can be retained within the multiphase catalytic impinging-stream reaction kettle.

2. A multiphase catalytic tower-type impinging-stream reactor as defined in claim 1, wherein the said flow channel plate is replaced by a catch tray made of an imperforated blind plate; meanwhile the pipe and the first valve are adopted to connect together the lower part of the plate or packed tower, the lower part of the catch tray and the multiphase catalytic impinging-stream reaction kettle so that the gas in the upper part of the multiphase catalytic impinging-stream reaction kettle can flow into the plate of packed tower; the pipe connecting the said catch tray and the self-sucking device and the second valve are adopted to connect together the lower part of the plate or packed tower and the self-sucking device on the upper ejector of the multiphase catalytic impinging-stream reaction kettle so that the reaction liquid in the lower part of the plate or packed tower can flow into the self-sucking device on the upper ejector of the multiphase catalytic impinging-stream reaction kettle; the pipe between the said self-sucking device and the said multiphase catalytic impinging-stream reaction kettle is adopted to connect together the self-sucking device on the upper ejector of the multiphase catalytic impinging-stream reaction kettle and the multiphase catalytic impinging-stream reaction kettle so that the unreacted gas in the multiphase catalytic impinging-stream reaction kettle can circulate around; in addition, the gas inlet pipe and the gas distributor are installed at the bottom of the multiphase catalytic impinging-stream reaction kettle.

3. A multiphase catalytic tower-type impinging-stream reactor as defined in claim 1, wherein the said lower ejector is bell-mouth in shape; on the top of the lower ejector is designed with a disc distributor, at the center of which exists a vertical flow channel and at the periphery of which exist a ring of oblique holes with obliquity ranging from 5° to 20°.

4. A multiphase catalytic tower-type impinging-stream reactor as defined in claim 1, wherein the said lower ejector is secured on the bottom of the multiphase catalytic impinging-stream reaction kettle either by welding or by a flange.

5. A multiphase catalytic tower-type impinging-stream reactor as defined in claim 1, wherein both ends of the said baffle plate of the static liquid zone are 5-20 mm away from the top and the bottom the multiphase catalytic impinging-stream reaction kettle respectively.

6. A multiphase catalytic tower-type impinging-stream reactor as defined in claim 1, wherein the said baffle plate of the static liquid zone of is removable; it is secured on the side wall of the multiphase catalytic impinging-stream reaction kettle by means of slots or screws.

\* \* \* \* \*